(12) United States Patent
Yigzaw et al.

(10) Patent No.: US 12,189,468 B2
(45) Date of Patent: Jan. 7, 2025

(54) CLOUD SCALE SERVER RELIABILITY MANAGEMENT

(71) Applicant: Intel Corporation, Santa Clara, CA (US)

(72) Inventors: Theodros Yigzaw, Sherwood, OR (US); John Holm, Beaverton, OR (US); Subhankar Panda, Portland, OR (US); Hugo Enrique Gonzalez Chavero, Tlaquepaque (MX); Satyaprakash Nanda, Portland, OR (US); Omar Avelar Suarez, Zapopan (MX); Guarav Porwal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 711 days.

(21) Appl. No.: 17/332,302

(22) Filed: May 27, 2021

(65) Prior Publication Data

US 2021/0286667 A1    Sep. 16, 2021

(51) Int. Cl.
*G06F 11/07* (2006.01)

(52) U.S. Cl.
CPC ...... *G06F 11/0793* (2013.01); *G06F 11/0751* (2013.01); *G06F 11/0772* (2013.01)

(58) Field of Classification Search
CPC .......................... G06F 11/0793; G06F 11/0751
USPC ............................................................ 714/2
See application file for complete search history.

(56) References Cited

U.S. PATENT DOCUMENTS

| | | | |
|---|---|---|---|
| 2004/0153823 A1* | 8/2004 | Ansari | G06F 11/0793 714/38.14 |
| 2006/0010352 A1* | 1/2006 | Mukherjee | G06F 11/0775 714/E11.026 |
| 2019/0042299 A1* | 2/2019 | Neiger | G06F 12/1475 |

OTHER PUBLICATIONS

Wikipedia "IPMI" page, from date May 2, 2021 retrieved using the WayBackMachine from https://web.archive.org/web/20210502034521/https://en.wikipedia.org/wiki/Intelligent_Platform_Management_Interface#Baseboard_management_controller (Year: 2021).*

* cited by examiner

*Primary Examiner* — Yair Leibovich
(74) *Attorney, Agent, or Firm* — Essential Patents Group, LLP

(57) ABSTRACT

An embodiment of an electronic apparatus may comprise one or more substrates, and a controller coupled to the one or more substrates, the controller including circuitry to provide management of a connected hardware subsystem with respect to one or more of reliability, availability and serviceability, and coordinate the management of the connected hardware subsystem with respect to one or more of reliability, availability and serviceability between the connected hardware subsystem and a host. Other embodiments are disclosed and claimed.

14 Claims, 6 Drawing Sheets

CLOUD SCALE SERVER RELIABILITY MANAGEMENT

BACKGROUND

Reliability, availability and serviceability (RAS) is a computer term that refers to the reduction or elimination of hardware failures to ensure minimum system downtime. With respect to servers, RAS may refer to a measure of robustness of the server. Reliability measures may include a probability that a server will produce correct outputs, which may be measured as mean time between failures (MTBF). For example, RAS features may help to avoid, detect and repair hardware faults. For example, some memory devices may include a post package repair (PPR) feature that can permanently repair a failing memory region. PPR provides a permanent in-field repair that allows for recovery from a hard error without replacing the memory device. Availability measures may include a probability that a system is operational at a given time, which may be measured as a percentage of downtime over a period of time. Serviceability may refer to how simple or fast repairs and maintenance may be performed on a server, which may be measured as mean time between repair (MTBR). RAS may sometimes also be referred to reliability, availability, and maintainability (RAM).

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
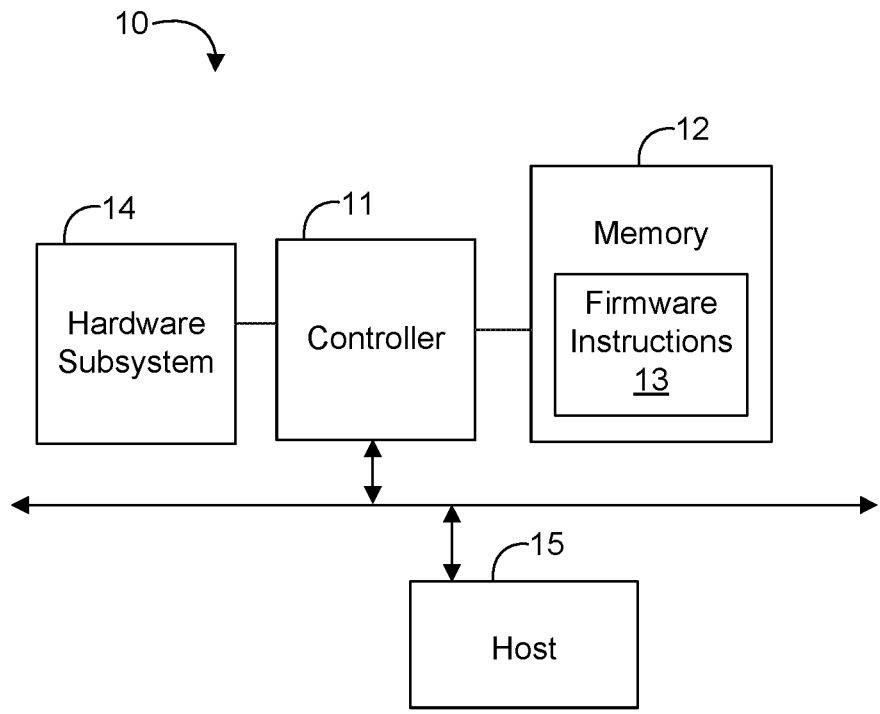
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, Field Programmable Gate Array (FPGA), firmware, driver, software, or any combination thereof. The material disclosed herein may also be implemented as instructions stored on a machine-readable medium, which may be read and executed by Moore Machine, Mealy Machine, and/or one or more processors. A machine-readable medium may include any medium and/or mechanism for storing or transmitting information in a form readable by a machine (e.g., a computing device). For example, a machine-readable medium may include read only memory (ROM); random access memory (RAM); Dynamic random-access memory (DRAM), magnetic disk storage media; optical storage media; NV memory devices; phase-change memory, qubit solid-state quantum memory, electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4

(these standards are available at jedec.org). Such standards (and similar standards) may be referred to as DDR-based standards and communication interfaces of the storage devices that implement such standards may be referred to as DDR-based interfaces.

NV memory (NVM) may be a storage medium that does not require power to maintain the state of data stored by the medium. In one embodiment, the memory device may include a three dimensional (3D) crosspoint memory device, or other byte addressable write-in-place nonvolatile memory devices. In one embodiment, the memory device may be or may include memory devices that use chalcogenide glass, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, or other suitable standard (the JEDEC standards cited herein are available at jedec.org).

With reference to FIG. 1, an embodiment of an electronic system 10 may include a controller 11, and memory 12 communicatively coupled to the controller 11. The memory 12 may store firmware instructions 13 that when executed by the controller 11 cause the controller 11 to provide management of a connected hardware subsystem 14 with respect to one or more of reliability, availability and serviceability, and to coordinate the management of the connected hardware subsystem 14 with respect to one or more of reliability, availability and serviceability between the connected hardware subsystem 14 and a host 15. In some embodiments, the memory 12 may store further firmware instructions 13 that when executed by the controller 11 cause the controller 11 to proactively notify the host 15 of a temporary failure event for the connected hardware subsystem 14. For example, the memory 12 may store further firmware instructions 13 that when executed by the controller 11 cause the controller 11 to release a hardware resource of the connected hardware subsystem 14 related to the temporary failure event in response to a communication from the host 15 that indicates that the host 15 has undertaken a failure mitigation action for the notified temporary failure event, and to initiate a self-repair action for the released hardware resource (e.g., further in response to the indication from the host 15 and after the hardware resource is released). In some embodiments, the memory 12 may store further firmware instructions 13 that when executed by the controller 11 cause the controller 11 to notify the host 15 that the released hardware resource may be reclaimed if the self-repair action is successful, and/or notify the host 15 that the temporary failure event is a permanent failure event if the self-repair action is unsuccessful.

In some embodiments the connected hardware subsystem 14 may correspond to a memory subsystem, and the memory 12 may store further firmware instructions 13 that when executed by the controller 11 cause the controller 11 to release a portion of memory of the memory subsystem related to the temporary failure event in response to a communication from the host 15 that indicates that the host 15 has temporarily mapped out the portion of memory, and to initiate a post-package repair (PPR) for the released portion of memory (e.g., further in response to the indication from the host 15 that the portion of memory is mapped out and after the portion of memory is released). For example, the memory 12 may also store firmware instructions 13 that when executed by the controller 11 cause the controller 11 to notify the host 15 that the released portion of memory may be reused if the PPR is successful, and/or notify the host 15 that the portion of memory of the memory subsystem is to remain mapped out if the PPR is unsuccessful.

Embodiments of each of the above controller 11, memory 12, firmware instructions 13, and other system components may be implemented in hardware, software, or any suitable combination thereof. For example, hardware implementations may include configurable logic such as, for example, programmable logic arrays (PLAs), FPGAs, complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 11 may include a general purpose controller, a special purpose controller, a memory controller, a storage controller, a micro-controller, a general purpose processor, a special purpose processor, a central processor unit (CPU), an execution unit, etc. In some embodiments, the memory 12, the firmware instructions 13, and/or other system memory may be located in, or co-located with, various components, including the controller 11 (e.g., on a same die).

Alternatively, or additionally, all or portions of these components may be implemented in one or more modules as a set of logic instructions stored in a machine- or computer-readable storage medium such as RAM, ROM, programmable ROM (PROM), firmware, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages. For example, the memory 12, persistent storage media, or other system memory may store the set of firmware instructions 13 which when executed by the controller 11 cause the system 10 to implement one or more components, features, or aspects of the system 10 (e.g., managing the connected hardware subsystem 14, coordinating the management of reliability, availability and/or serviceability between the connected hardware subsystem 14 and the host 15, etc.).

Figure 2:
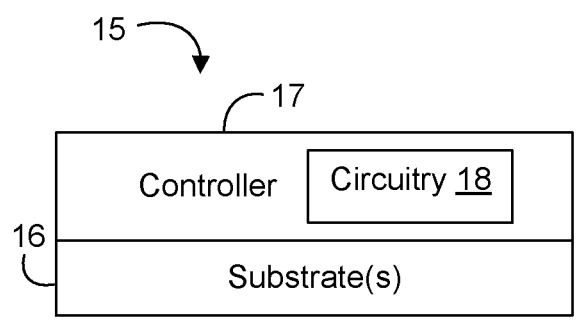
FIG. 2 is a block diagram of an example of an electronic apparatus according to an embodiment.

With reference to FIG. 2, an embodiment of an electronic apparatus 15 may include one or more substrates 16, and a controller 17 coupled to the one or more substrates 16. The controller 17 may include circuitry 18 to provide management of a connected hardware subsystem with respect to one or more of reliability, availability and serviceability, and to coordinate the management of the connected hardware subsystem with respect to one or more of reliability, availability and serviceability between the connected hardware subsystem and a host. In some embodiments, the circuitry 18 may be further configured to proactively notify the host of a temporary failure event for the connected hardware subsystem. For example, the circuitry 18 may be further configured to release a hardware resource of the connected hardware subsystem related to the temporary failure event in response to a communication from the host that indicates that the host has undertaken a failure mitigation action for the notified temporary failure event, and to initiate a self-repair action for the released hardware resource. In some embodiments, the circuitry 18 may also be configured to notify the host that the released hardware resource may be reclaimed if the self-repair action is successful, and/or to notify the host that the temporary failure event is a permanent failure event if the self-repair action is unsuccessful.

In some embodiments, the connected hardware subsystem may correspond to a memory subsystem, and the circuitry 18 may be configured to release a portion of memory of the memory subsystem related to the temporary failure event in response to a communication from the host that indicates that the host has temporarily mapped out the portion of memory, and to initiate a PPR for the released portion of memory. For example, the circuitry 18 may be further configured to notify the host that the released portion of memory may be reused if the PPR is successful, and/or to notify the host that the portion of memory of the memory subsystem is to remain mapped out if the PPR is unsuccessful.

Embodiments of the circuitry 18 may be implemented in a system, apparatus, computer, device, etc., for example, such as those described herein. More particularly, hardware implementations of the circuitry 18 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the circuitry 18 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the circuitry 18 may be implemented on a semiconductor apparatus, which may include the one or more substrates 16, with the circuitry 18 coupled to the one or more substrates 16. In some embodiments, the circuitry 18 may be at least partly implemented in one or more of configurable logic and fixed-functionality hardware logic on semiconductor substrate(s) (e.g., silicon, sapphire, gallium-arsenide, etc.). For example, the circuitry 18 may include a transistor array and/or other integrated circuit components coupled to the substrate(s) 16 with transistor channel regions that are positioned within the substrate(s) 16. The interface between the circuitry 18 and the substrate(s) 16 may not be an abrupt junction. The circuitry 18 may also be considered to include an epitaxial layer that is grown on an initial wafer of the substrate(s) 16.

Figure 3A:
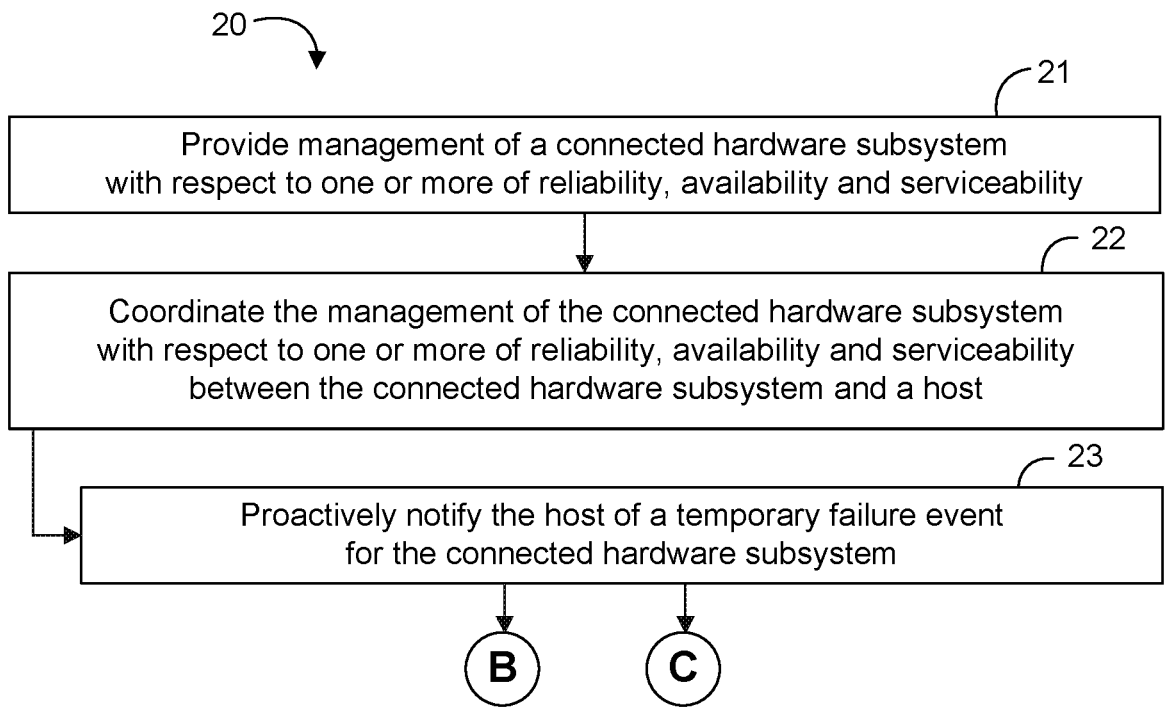
FIGS. 3A to 3C is a flowchart of an example of a method of managing a subsystem according to an embodiment.
Figure 3B:
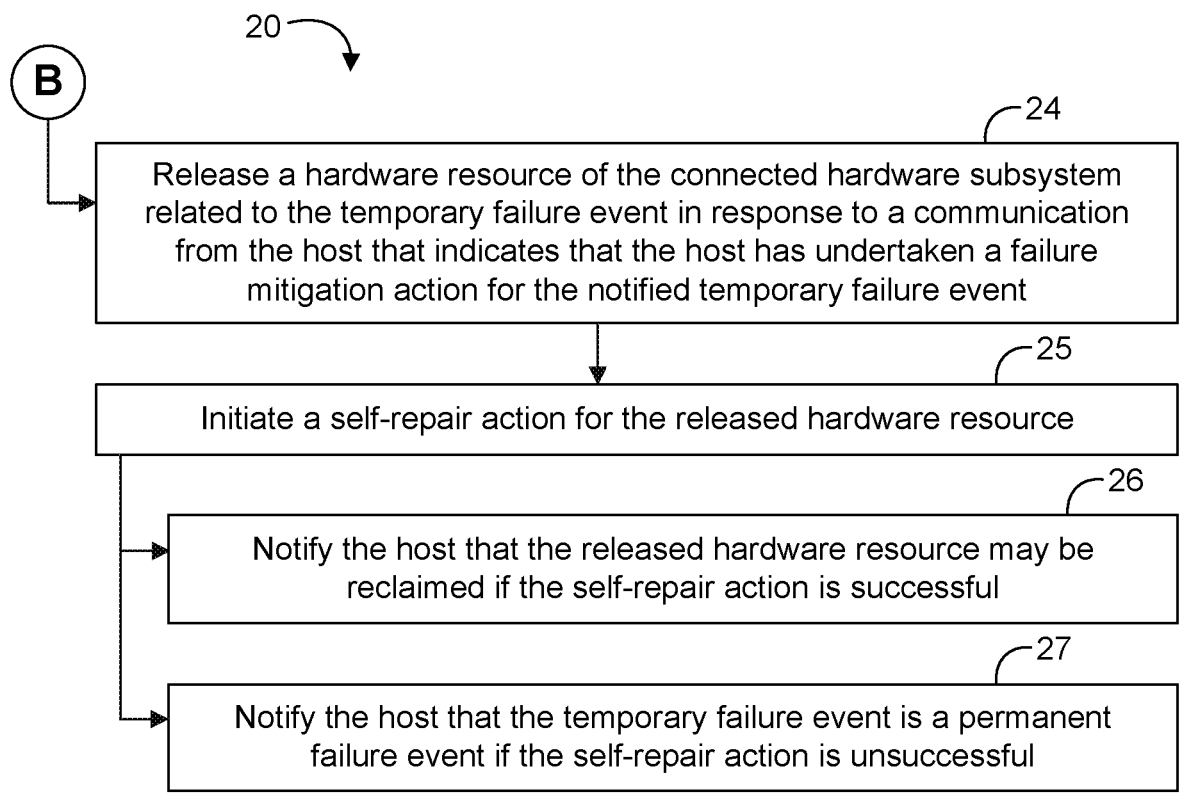
Figure 3C:
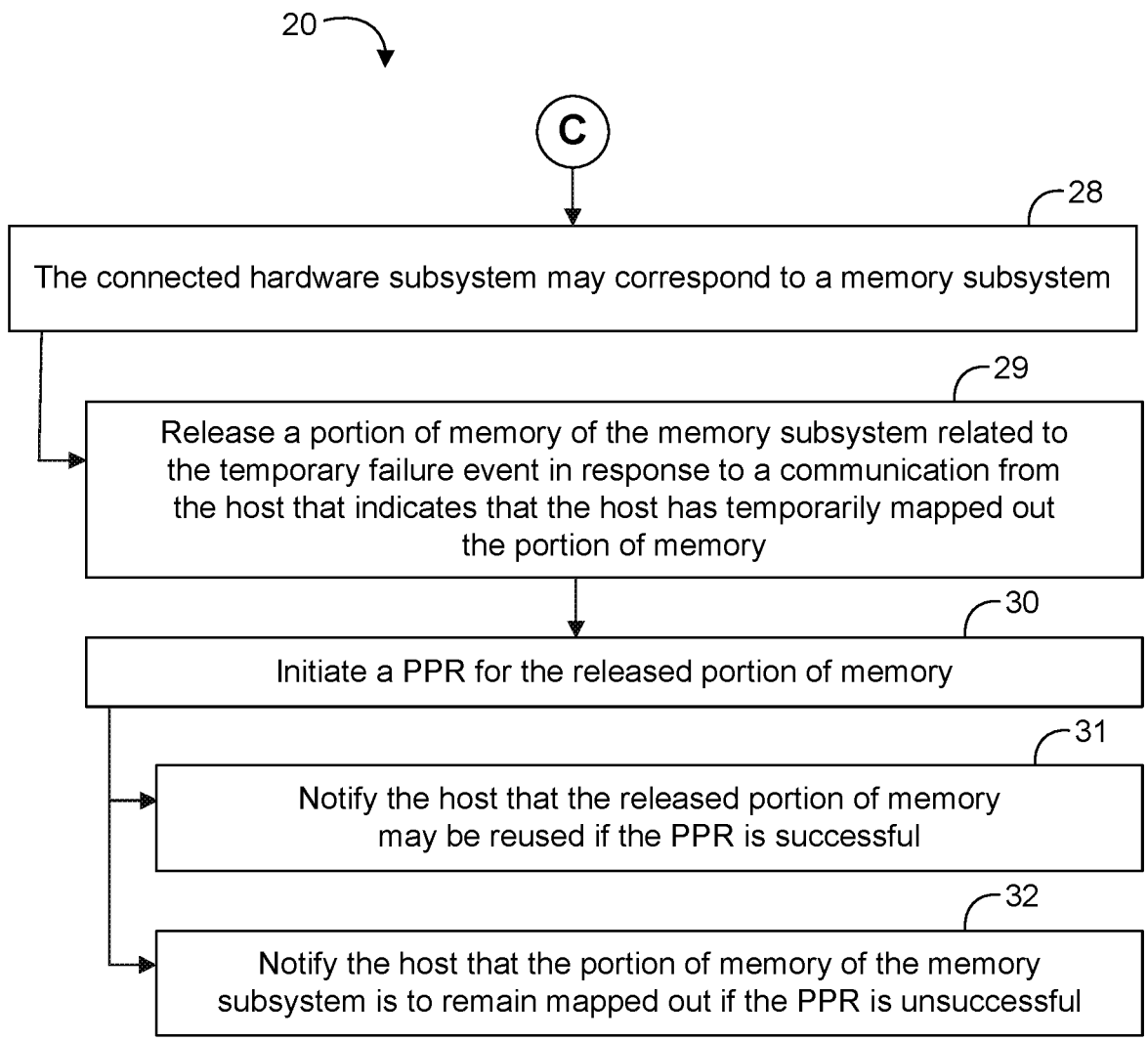

Turning now to FIGS. 3A to 3C, an embodiment of a method 20 of managing a subsystem may include providing management of a connected hardware subsystem with respect to one or more of reliability, availability and serviceability at block 21, and coordinating the management of the connected hardware subsystem with respect to one or more of reliability, availability and serviceability between the connected hardware subsystem and a host at block 22. Some embodiments of the method 20 may further include proactively notifying the host of a temporary failure event for the connected hardware subsystem at block 23. For example, the method 20 may also include releasing a hardware resource of the connected hardware subsystem related to the temporary failure event in response to a communication from the host that indicates that the host has undertaken a failure mitigation action for the notified temporary failure event at block 24, and initiating a self-repair action for the released hardware resource at block 25 (e.g., further in response to the indication from the host). Some embodiments of the method 20 may further include notifying the host that the released hardware resource may be reclaimed if the self-repair action is successful at block 26, and/or notifying the host that the temporary failure event is a permanent failure event if the self-repair action is unsuccessful at block 27.

In some embodiments, the connected hardware subsystem may correspond to a memory subsystem at block 28, and the method 20 may further include releasing a portion of memory of the memory subsystem related to the temporary failure event in response to a communication from the host that indicates that the host has temporarily mapped out the portion of memory at block 29, and initiating a PPR for the released portion of memory at block 30. For example, the method 20 may also include notifying the host that the released portion of memory may be reused if the PPR is successful at block 31, and/or notifying the host that the portion of memory of the memory subsystem is to remain mapped out if the PPR is unsuccessful at block 32.

Embodiments of the method 20 may be implemented in a system, apparatus, computer, device, etc., for example, such as those described herein. More particularly, hardware implementations of the method 20 may include configurable logic such as, for example, PLAs, FPGAs, CPLDs, or in fixed-functionality logic hardware using circuit technology such as, for example, ASIC, CMOS, or TTL technology, or any combination thereof. Hybrid hardware implementations include static dynamic System-on-Chip (SoC) re-configurable devices such that control flow, and data paths implement logic for the functionality. Alternatively, or additionally, the method 20 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the method 20 may be implemented on a computer readable medium. Embodiments or portions of the method 20 may be implemented in firmware, applications (e.g., through an application programming interface (API)), or driver software running on an OS. Additionally, logic instructions might include assembler instructions, instruction set architecture (ISA) instructions, data set architecture (DSA) commands, (machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, Moore Machine, Mealy Machine, etc.).

Some embodiments may advantageously provide technology for cloud scale server reliability management. A conventional arrangement between an OS and a platform firmware (e.g., basic input/output system (BIOS) or baseboard management controller (BMC)) is to take independent actions to maintain memory health. The OS may off-line pages based on correctable error (CE) rates or uncorrectable error (UCE) events. To deal with memory failure events, the platform may activate RAS features such as run time post package repair (PPR), partial cache line sparing (PCLS) and other memory sparing techniques. The OS and platform conventionally do not coordinate their efforts. For example, the OS may offline a page while the platform activates run time PPR for the failed memory region. The lack of coordination leads to undue consumption of crucial hardware resources and at times leads to degraded performance.

Advantageously, some embodiments provide technology for the OS and platform firmware to interact with each other to coordinate various RAS efforts. Some embodiments may define one or more data structures that are exchanged between a BIOS and the OS, one or more techniques invoked by the OS to inform crucial decisions with the BIOS, and/or a protocol of communication between the BIOS and the OS. Advantageously, by coordinating efforts between the OS and the BIOS, some embodiments may provide effective utilization of hardware resources, verticalization of platform level RAS, efficiency in data center level telemetry or predictive failure analysis, and/or load balance of dormant virtual machines or workloads in a scaled deployment.

Figure 4:
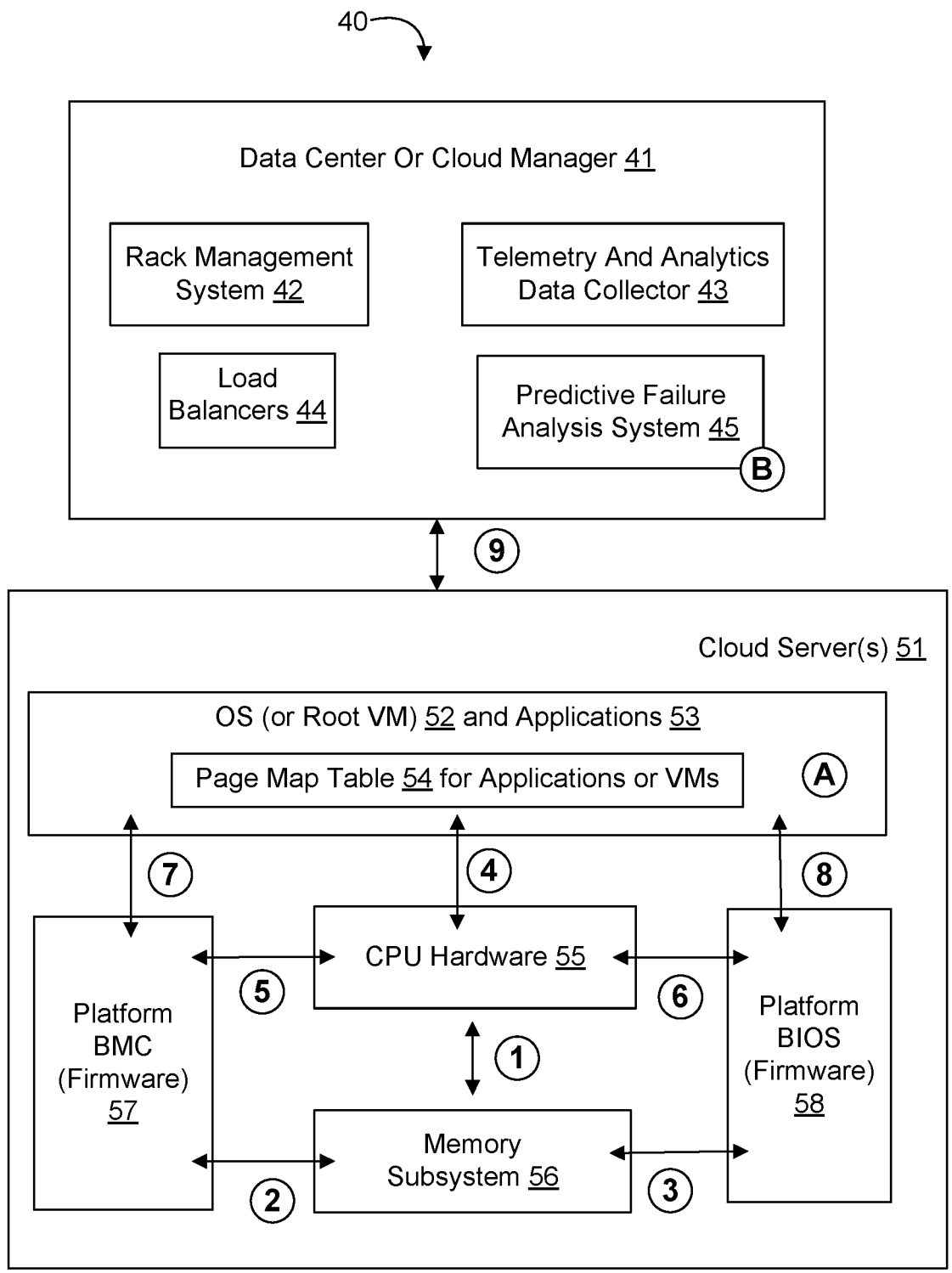
FIG. 4 is a block diagram of an example of a computing environment according to an embodiment.

With reference to FIG. 4, an embodiment of a computing environment 40 includes a data center or cloud manager 41 communicatively coupled to one or more cloud server(s) 51, with a high level architecture of the cloud stack and flows as shown. Non-limiting examples of high-level components of the manager 41 include a rack management system 42, a telemetry and analytics data collector 43, load balancers 44, and a predictive failure analysis system 45. Non-limiting examples of high-level components of the cloud server(s) 51 include an OS (or Root virtual machine (VM)) 52 and applications 53 (e.g., which includes a page map table 54 for applications or VMs), CPU hardware 55 (e.g., single of multiple sockets with many cores, memory and input/output (IO) controllers), a memory subsystem 56 (e.g., DDR4/5, high bandwidth memory (HBM), cache blocks/ways, read/write data buffers, etc.), and platform BMC 57 and BIOS 58 firmware, coupled as shown. The BMC 57, BIOS 58, and/or other platform components track error rates, error logs and threshold hit events to determine isolation of erroneous section of memory components (e.g., devices, rows etc.) of the memory subsystem 56. The platform firmware includes technology to isolate the section via features such as run time PPR, cache line sparing, etc. Other subsystems may include similar self-diagnostic and self-repair technology.

As illustrated in FIG. 4, the circles indicated with numerals 1 through 9 and letters A and B indicates various points of communication or process flow. Point 1 indicates an exchange of error information, an address linked to an error, error protection metadata, and error protection flows. Points 2 and 3 indicate a sideband connection for configuration, control and management (e.g., on a serial bus). Point 4 indicates a hardware access for error logs and a primary data path. Points 5 and 6 indicate error log and signaling for system control (e.g., RAS features). Some embodiments, at points 7 and 8, further include exchange of information between the OS 52 and the platform firmware (BIOS 58 and/or BMC 57) related to error isolation, prevention and reports. Advantageously, points 7 and 8 support OS and firmware interaction and flows for collaborative control. For example, at point A, the OS may maintain information for erroneous addresses in the memory subsystem 56, error counts, usage statistics, etc., and the OS may hen make offline decisions based on the maintained information. Some embodiments, at point 9, further include exchange of information for data center wide control and management reports and control flows. For example, the manager 41 may maintain information for vendor and part number of CPUs and memory subsystems within each cloud server, historical view of error profile in the data center scale, etc.

In some embodiments, platform firmware such as the BIOS 58 or BMC 57 proactively communicates to the OS 52. The OS 52 may also invoke Device Specific Methods (DSM) to inform the platform firmware. For the payload of communication, for example, some embodiments may utilize an Advanced Configuration and Power Interface (ACPI) specified RAS Feature (RASF) data structure (e.g., see https://uefi.org/htmlspecs/ACPI_Spec_6_4_html). For example, a vendor specific augmentation such as specific RAS feature that mapped out certain section of memory component can be communicated by the platform firmware to the OS 52 (e.g., at points 7 and/or 8). If the OS 52 determines or decides to offline certain section of memory page, the OS 52 may call a DSM to inform the platform firmware to release hardware resources that tracks the off-lining. Advantageously, a proactive communication from the OS 52 could prevent crucial resources like a PPR entry in a dual-inline memory module (DIMM), serial presence detect (SPD) entries to track error locations and so forth (e.g., also at points 7 and/or 8). In some embodiments, proactive notifications from the platform firmware (e.g., BMC 57 and/or BIOS 58 at points 7 and 8, respectively) can be remembered by the OS 52 for future decision making (e.g., at point A) and also communication from the OS 52 to the data center manager 41 can be helpful to feed information such as specific CPU or memory vendors, configurations and related details for scale telemetry and failure prevention (e.g., at point B).

Although various details are presented herein with respect to memory subsystems and devices, embodiments may be readily configured to provide similar technology for other devices and/or subsystems such as PCIe devices, smart network interface cards (NICs), accelerators, etc. Some embodiments may also be configured for memory pooling arrangements, to coordinate off-lining of memory pages between the OS and the memory devices. Some embodiments may also be configured for a cloud scale OS as opposed to a per system OS, to manage servers and components for controlled reliability. In a VM environment, a data center manager can use the information provided by the root VM to color a specific VM that is getting impacted due to loss of resources or to identify a potential to deviate from service level agreements.

As noted above, memory techniques such as PPR, Virtual Lock Step (VLS) and Partial Cache Line Sparing (PCLS) involve costly hardware resources as RAS features. Such techniques also have impact to performance of the overall system. Advantageously, some embodiments provide technology to reclaim otherwise lost hardware resources. Some embodiments improve or optimize the impact and utilization of these techniques/resources with a handshake between the platform firmware and the OS to accomplish extended values.

RASF Data Structure Examples

In some embodiments, a RAS_Feature_Table is the primary data structure that is exchanged between the platform firmware (e.g., BIOS/BMC) and the OS (e.g., at points 7 and 8 in FIG. 4). The platform firmware (FW) interacts with hardware (HW) and fills and exchanges various required counters (e.g., at points 2 and 5, or points 3 and 6). For example, the feature table format and interaction flows are defined by the ACPI specification for the OS. Some embodiments utilize the RASF data structure and flows as an example of a suitable primary communication method, while defining new features for OS interaction. Other embodiments may utilize any other kind of suitable software interface or specification that can accomplish the same functionality. An example data structure is as follows:

```
typedef struct
{
// Part of the common header that needs to be present for
    compatibility with ACPI
unsigned int Signature; // Fixed value='RASF'
unsigned int Length; // number of events appended @
    Payload
unsigned char Revision; // Revision number
unsigned char Checksum; // Sum of the table should be 0
unsigned char OemId[6]; // OEM Identifier
unsigned long OemTableId; // OEM Manufacturer Model
    Id
unsigned int OemRevision; // OEM Revision
unsigned int CreatorId; // Creator Vendor ID
unsigned int CreatorRevision; // Creator Revision
// RAS Feature Entries that are exchanged as a part of the
    invention
unsigned char *Payload[12];//Each entry is 12 bytes long
// Length denotes number of such entries}
} RAS_Feature_Table;
```

Example Extension to the RAS Capability

In some embodiments, a RAS capability that can be shared with the OS is put in a bit vector and the following additional capabilities are added (as an illustrative example). Some embodiments may provide further extensions with further additional RAS features.

Bit Vector x: where x starts at the reserved fields in the ACPI specification (e.g., a few bits are added for illustrative purposes, but there are over 100 additional bits available for extension):
  x+0=Run time memory row repair
  x+1=Run time cache line sparing (HBM and DDR4 applicable)
  x+2= . . .

Platform Firmware to OS Data Structure Examples

An embodiment of a platform firmware to OS data structure is packed onto the RAS Feature Table's payload section(s). Based on the size of the data structure, multiple payload entries are created, and the "Length" variable below reflects the count. For example, the data structure may reuse existing platform defined data structures, plus extensions in accordance with embodiments.

```
typedef struct {// This is a reuse
UINT8 SectionType[16];
UINT32 ErrorSeverity;
UINT16 Revision;
UINT8 ValidationBits;
UINT8 Flags;
UINT32 ErrorDataLength;
UINT8 FruId[16];
UINT8 FruText[20];
} EFI_GENERIC_ERROR_DATA_ENTRY_STRUCTURE;
typedef struct {
EFI_GENERIC_ERROR_DATA_ENTRY_STRUCTURE header;
Unsigned int Length; // Length of appended payload
// Added due to embodiments
// Platform Time Stamp, Date and Time from Platform
    FW
// List of System Physical Addresses
// Count of address (with Count of Addresses depending
    on feature associated)
// Run time row repair will be 1
// Run time cache line sparing (HBM and DDR4) is max
    16)
// DIMM SPD information, Manufacturer Details
// Temporary or Permanent Issue Flag
} Platform_FW_OS_Payload;
```

Temporary or Permanent Issue Flag Examples

Figure 5:
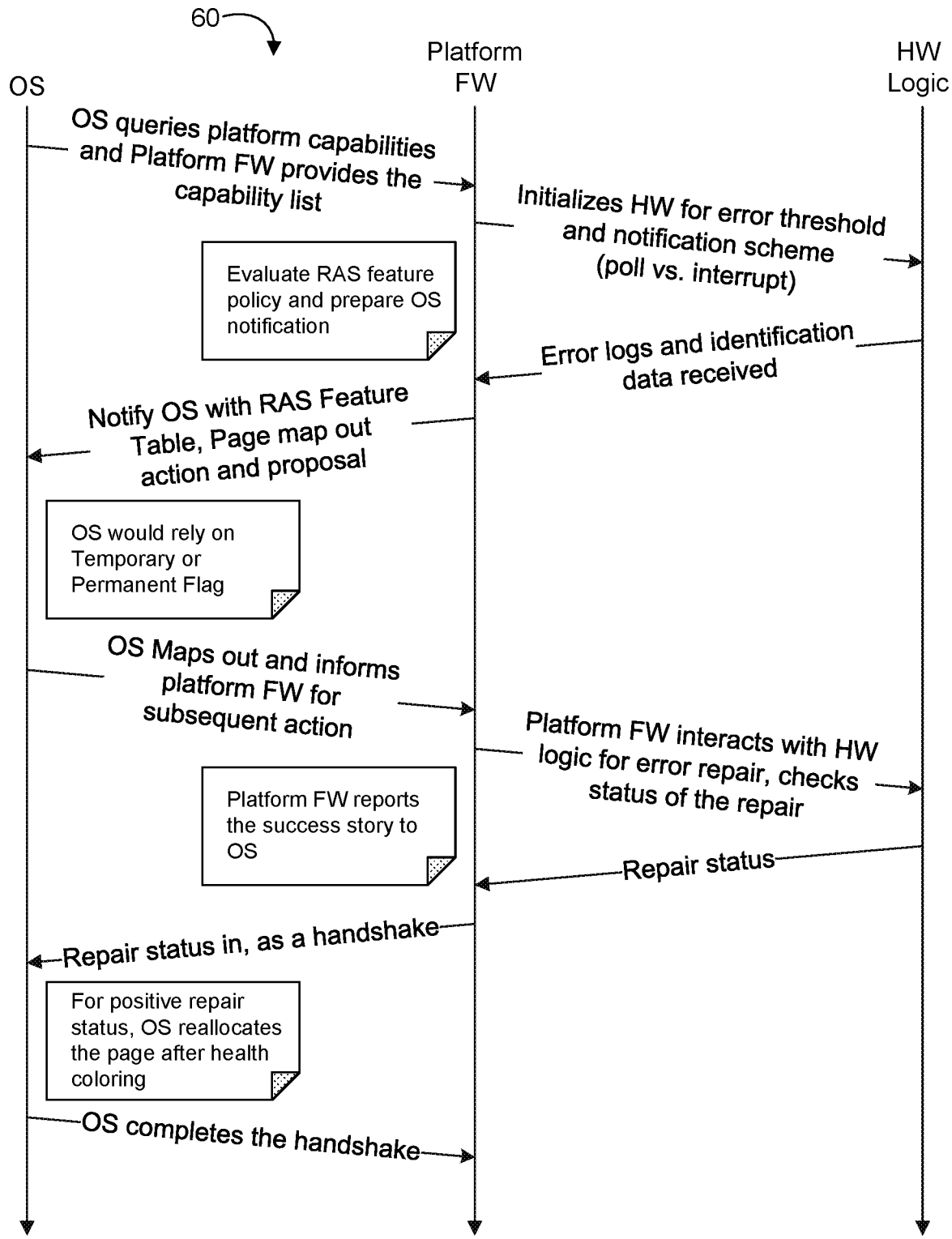
FIG. 5 is an illustrative diagram of an example of a process flow according to an embodiment.

With reference to FIG. 5, an embodiment of a process flow 60 illustrates a platform firmware and OS interaction for temporary page off-lining. The OS may query the platform capabilities and the platform firmware may provide the capability list. The platform firmware has deeper visibility into the hardware and resources. For example, the platform firmware may evaluate the RAS policy and prepare a notification for the OS. If the platform firmware detects a condition (e.g., that a DRAM faulty row can be repaired in the run time, based on pre-programmed error thresholds), the platform firmware may send a "Temporary Issue Flag" to the OS. The OS may rely on the "Temporary" or "Permanent" flag, and then temporarily map out that page and inform the platform firmware of the same.

The platform firmware may then interact with the hardware logic for error repair, and check the status of the repair. After the hardware logic completes the repair and reports the status to the platform firmware, the platform firmware then informs the OS of the repair status in a handshake. For a positive repair status, the OS then reallocates the page (e.g., after health coloring). Thereafter, the OS can start reusing the page and the OS completes the handshake. In the event that the platform firmware cannot successfully complete the repair process, the platform firmware informs the OS to permanently map the page out. If other hardware resources such as a cache line sparing is available, platform firmware may attempt for a follow-on policy on sparing. A similar process flow may be implemented for other devices.

Platform Firmware and OS Interaction Examples

In some embodiments, the platform firmware and OS interaction is solely based on ACPI specification, with the payload supporting the advanced RAS manageability features of various embodiments. For example, the platform firmware may report via platform defined serial communication interface (SCI) mechanism and the OS may invoke using DSM.

Data Center or Cloud Manager Examples

At point B in FIG. 4, for example, some embodiments may utilize a health coloring scheme. As the platform firmware reports about a specific component that is undergoing errors and being repaired, the data center manager keeps a history of the vendor, error rate and repair status as follows:

For multiple successful repairs, it can apply a GREEN to YELLOW coloring scheme.
  The coloring scheme can be applicable to a Platform or Blade, a CPU on the Socket or even a specific DIMM (along with manufacturers).

Pre error repair, system can still run on degraded mode as platform firmware would notify the condition autonomously.

Post error repair, a page map out decision can be reversed, and memory footprint can be reclaimed (e.g., providing a performance benefit).

With the history, some embodiments provide a closed-loop feedback to overall cloud resiliency for VM migration or reuse of the system after a health fix. In the event that the platform firmware detects that hardware errors mostly seen by a patrol scrub engine, that inference may also be propagated to determine dormant VMs. The data center manager may then migrate the dormant VMs or squeeze their resource allocation (e.g., a coloring scheme for dormant VMs).

As time goes on, or when the server has been ON for multiple years, the platform firmware may run out of hardware resources and notify the OS with "CRITICAL" warnings via the "Temporary/Permanent Flag" as described above (e.g., an age based coloring scheme). The cloud manager may then be forced to end of life the involved components or add value to field replaceable unit (FRU) isolation. After a repair is done, the platform firmware may involve the patrol scrub engine or hardware assisted built-in self test (BIST)/patterns to scrub the involved portion of memory for health check before the OS notification.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 6:
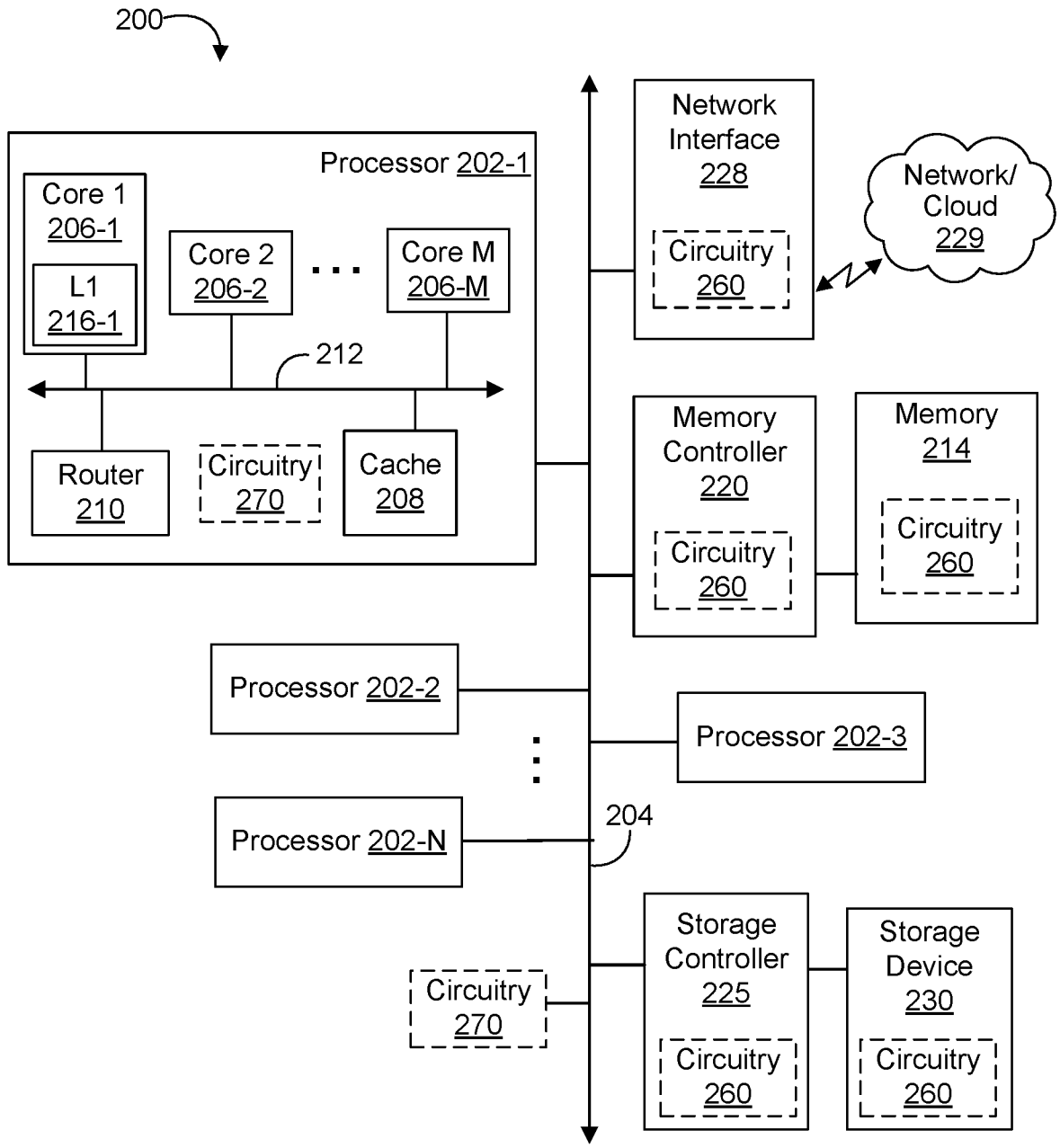
FIG. 6 is a block diagram of an example of a computing system according to an embodiment.

Turning now to FIG. 6, an embodiment of a computing system 200 may include one or more processors 202-1 through 202-N (generally referred to herein as "processors 202" or "processor 202"). The processors 202 may communicate via an interconnection or bus 204. Each processor 202 may include various components some of which are only discussed with reference to processor 202-1 for clarity. Accordingly, each of the remaining processors 202-2 through 202-N may include the same or similar components discussed with reference to the processor 202-1.

In some embodiments, the processor 202-1 may include one or more processor cores 206-1 through 206-M (referred to herein as "cores 206," or more generally as "core 206"), a cache 208 (which may be a shared cache or a private cache in various embodiments), and/or a router 210. The processor cores 206 may be implemented on a single integrated circuit (IC) chip. Moreover, the chip may include one or more shared and/or private caches (such as cache 208), buses or interconnections (such as a bus or interconnection 212), circuitry 270, memory controllers, or other components.

In some embodiments, the router 210 may be used to communicate between various components of the processor 202-1 and/or system 200. Moreover, the processor 202-1 may include more than one router 210. Furthermore, the multitude of routers 210 may be in communication to enable data routing between various components inside or outside of the processor 202-1.

The cache 208 may store data (e.g., including instructions) that is utilized by one or more components of the processor 202-1, such as the cores 206. For example, the cache 208 may locally cache data stored in a memory 214 for faster access by the components of the processor 202. As shown in FIG. 6, the memory 214 may be in communication with the processors 202 via the interconnection 204. In some embodiments, the cache 208 (that may be shared) may have various levels, for example, the cache 208 may be a mid-level cache and/or a last-level cache (LLC). Also, each of the cores 206 may include a level 1 (L1) cache (216-1) (generally referred to herein as "L1 cache 216"). Various components of the processor 202-1 may communicate with the cache 208 directly, through a bus (e.g., the bus 212), and/or a memory controller or hub.

As shown in FIG. 6, memory 214 may be coupled to other components of system 200 through a memory controller 220. Memory 214 may include volatile memory and may be interchangeably referred to as main memory or system memory. Even though the memory controller 220 is shown to be coupled between the interconnection 204 and the memory 214, the memory controller 220 may be located elsewhere in system 200. For example, memory controller 220 or portions of it may be provided within one of the processors 202 in some embodiments. Alternatively, memory 214 may include byte-addressable non-volatile memory such as INTEL OPTANE technology.

The system 200 may communicate with other devices/systems/networks via a network interface 228 (e.g., which is in communication with a computer network and/or the cloud 229 via a wired or wireless interface). For example, the network interface 228 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 229.

System 200 may also include a storage device such as a storage device 230 coupled to the interconnect 204 via storage controller 225. Hence, storage controller 225 may control access by various components of system 200 to the storage device 230. Furthermore, even though storage controller 225 is shown to be directly coupled to the interconnection 204 in FIG. 6, storage controller 225 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), Serial Attached SCSI (SAS), Fiber Channel, etc.) with one or more other components of system 200 (for example where the storage bus is coupled to interconnect 204 via some other logic like a bus bridge, chipset, etc.) Additionally, storage controller 225 may be incorporated into memory controller logic or provided on a same integrated circuit (IC) device in various embodiments (e.g., on the same circuit board device as the storage device 230 or in the same enclosure as the storage device 230).

Furthermore, storage controller 225 and/or storage device 230 may be coupled to one or more sensors (not shown) to receive information (e.g., in the form of one or more bits or signals) to indicate the status of or values detected by the one or more sensors. These sensor(s) may be provided proximate to components of system 200 (or other computing systems discussed herein), including the cores 206, interconnections 204 or 212, components outside of the processor 202, storage device 230, SSD bus, SATA bus, storage controller 225, circuitry 260, circuitry 270, etc., to sense variations in various factors affecting power/thermal behavior of the system/platform, such as temperature, operating frequency, operating voltage, power consumption, and/or inter-core communication activity, etc.

As shown in FIG. 6, features or aspects of the circuitry 260 and circuitry 270 may be distributed throughout the system 200, and/or co-located/integrated with various components of the system 200. Any aspect of the system 200 that may require or benefit from RSA feature management technology may include the circuitry 260 and/or the circuitry 270. For example, the processor(s) 202, the memory 214, the memory controller 220, the storage controller 225, and the network interface 228 may each include circuitry 260, which may be in the same enclosure as the system 200 and/or fully integrated on a printed circuit board (PCB) of the system 200. For example, the circuitry 270 may be configured to implement the CPU/host/server aspects of the various embodiments.

Advantageously, the circuitry 260 and the circuitry 270 may include technology to implement one or more aspects of the system 10 (FIG. 1), the apparatus 15 (FIG. 2), the method 20 (FIGS. 3A to 3C), the environment 40 (FIG. 4), the process flow 60 (FIG. 5), and/or any of the RSA management features discussed herein. The system 200 may include further circuitry 260 and located outside of the foregoing components.

In some embodiments, the circuitry 260 may be configured to provide management of a connected hardware subsystem with respect to one or more of reliability, availability and serviceability, and to coordinate the management of the connected hardware subsystem with respect to one or more of reliability, availability and serviceability between the connected hardware subsystem and a host. In some embodiments, the circuitry 260 may be further configured to proactively notify the host of a temporary failure event for the connected hardware subsystem. For example, the circuitry 260 may be further configured to release a hardware resource of the connected hardware subsystem related to the temporary failure event in response to a communication from the host that indicates that the host has undertaken a failure mitigation action for the notified temporary failure event, and to initiate a self-repair action for the released hardware resource. In some embodiments, the circuitry 260 may also be configured to notify the host that the released hardware resource may be reclaimed if the self-repair action is successful, and/or to notify the host that the temporary failure event is a permanent failure event if the self-repair action is unsuccessful.

In some embodiments, the connected hardware subsystem may correspond to a memory subsystem (e.g., memory controller 220 and memory 214), and the circuitry 260 may be configured to release a portion of the memory 214 of the memory subsystem related to the temporary failure event in response to a communication from the processor 202 that indicates that the processor 202 has temporarily mapped out the portion of memory 214, and to initiate a PPR for the released portion of memory 214. For example, the circuitry 260 may be further configured to notify the processor 202 that the released portion of memory 214 may be reused if the PPR is successful, and/or to notify the processor 202 that the portion of memory 214 of the memory subsystem is to remain mapped out if the PPR is unsuccessful.

ADDITIONAL NOTES AND EXAMPLES

Example 1 includes an electronic apparatus, comprising one or more substrates, and a controller coupled to the one or more substrates, the controller including circuitry to provide management of a connected hardware subsystem with respect to one or more of reliability, availability and serviceability, and coordinate the management of the connected hardware subsystem with respect to one or more of reliability, availability and serviceability between the connected hardware subsystem and a host.

Example 2 includes the apparatus of Example 1, wherein the circuitry is further to proactively notify the host of a temporary failure event for the connected hardware subsystem.

Example 3 includes the apparatus of Example 2, wherein the circuitry is further to release a hardware resource of the connected hardware subsystem related to the temporary failure event in response to a communication from the host that indicates that the host has undertaken a failure mitigation action for the notified temporary failure event, and initiate a self-repair action for the released hardware resource.

Example 4 includes the apparatus of Example 3, wherein the circuitry is further to notify the host that the released hardware resource may be reclaimed if the self-repair action is successful.

Example 5 includes the apparatus of any of Examples 3 to 4, wherein the circuitry is further to notify the host that the temporary failure event is a permanent failure event if the self-repair action is unsuccessful.

Example 6 includes the apparatus of Example 2, wherein the connected hardware subsystem corresponds to a memory subsystem, and wherein the circuitry is further to release a portion of memory of the memory subsystem related to the temporary failure event in response to a communication from the host that indicates that the host has temporarily mapped out the portion of memory, and initiate a post-package repair for the released portion of memory.

Example 7 includes the apparatus of Example 6, wherein the circuitry is further to notify the host that the released portion of memory may be reused if the post-package repair is successful.

Example 8 includes the apparatus of any of Examples 6 to 7, wherein the circuitry is further to notify the host that the portion of memory of the memory subsystem is to remain mapped out if the post-package repair is unsuccessful.

Example 9 includes an electronic system, comprising a controller, and memory communicatively coupled to the controller, wherein the memory stores firmware instructions that when executed by the controller cause the controller to provide management of a connected hardware subsystem with respect to one or more of reliability, availability and serviceability, and coordinate the management of the connected hardware subsystem with respect to one or more of reliability, availability and serviceability between the connected hardware subsystem and a host.

Example 10 includes the system of Example 9, wherein the memory stores further firmware instructions that when executed by the controller cause the controller to proactively notify the host of a temporary failure event for the connected hardware subsystem.

Example 11 includes the system of Example 10, wherein the memory stores further firmware instructions that when executed by the controller cause the controller to release a hardware resource of the connected hardware subsystem related to the temporary failure event in response to a communication from the host that indicates that the host has undertaken a failure mitigation action for the notified temporary failure event, and initiate a self-repair action for the released hardware resource.

Example 12 includes the system of Example 11, wherein the memory stores further firmware instructions that when executed by the controller cause the controller to notify the host that the released hardware resource may be reclaimed if the self-repair action is successful.

Example 13 includes the system of any of Examples 11 to 12, wherein the memory stores further firmware instructions that when executed by the controller cause the controller to notify the host that the temporary failure event is a permanent failure event if the self-repair action is unsuccessful.

Example 14 includes the system of Example 10, wherein the connected hardware subsystem corresponds to a memory subsystem, and wherein the memory stores further firmware instructions that when executed by the controller cause the controller to release a portion of memory of the memory subsystem related to the temporary failure event in response to a communication from the host that indicates that the host has temporarily mapped out the portion of memory, and initiate a post-package repair for the released portion of memory.

Example 15 includes the system of Example 14, wherein the memory stores further firmware instructions that when executed by the controller cause the controller to notify the host that the released portion of memory may be reused if the post-package repair is successful.

Example 16 includes the system of any of Examples 14 to 15, wherein the memory stores further firmware instructions that when executed by the controller cause the controller to notify the host that the portion of memory of the memory subsystem is to remain mapped out if the post-package repair is unsuccessful.

Example 17 includes a method of managing a subsystem, comprising providing management of a connected hardware subsystem with respect to one or more of reliability, availability and serviceability, and coordinating the management of the connected hardware subsystem with respect to one or more of reliability, availability and serviceability between the connected hardware subsystem and a host.

Example 18 includes the method of Example 17, further comprising proactively notifying the host of a temporary failure event for the connected hardware subsystem.

Example 19 includes the method of Example 18, further comprising releasing a hardware resource of the connected hardware subsystem related to the temporary failure event in response to a communication from the host that indicates that the host has undertaken a failure mitigation action for the notified temporary failure event, and initiating a self-repair action for the released hardware resource.

Example 20 includes the method of Example 19, further comprising notifying the host that the released hardware resource may be reclaimed if the self-repair action is successful.

Example 21 includes the method of any of Examples 19 to 20, further comprising notifying the host that the temporary failure event is a permanent failure event if the self-repair action is unsuccessful.

Example 22 includes the method of Example 18, wherein the connected hardware subsystem corresponds to a memory subsystem, further comprising releasing a portion of memory of the memory subsystem related to the temporary failure event in response to a communication from the host that indicates that the host has temporarily mapped out the portion of memory, and initiating a post-package repair for the released portion of memory.

Example 23 includes the method of Example 22, further comprising notifying the host that the released portion of memory may be reused if the post-package repair is successful.

Example 24 includes the method of any of Examples 22 to 23, further comprising notifying the host that the portion of memory of the memory subsystem is to remain mapped out if the post-package repair is unsuccessful.

Example 25 includes at least one non-transitory machine readable medium comprising a plurality of instructions that, in response to being executed on a computing device, cause the computing device to provide management of a connected hardware subsystem with respect to one or more of reliability, availability and serviceability, and coordinate the management of the connected hardware subsystem with respect to one or more of reliability, availability and serviceability between the connected hardware subsystem and a host.

Example 26 includes the at least one non-transitory machine readable medium of Example 22, comprising a plurality of further instructions that, in response to being executed on the computing device, cause the computing device to proactively notify the host of a temporary failure event for the connected hardware subsystem.

Example 27 includes the at least one non-transitory machine readable medium of Example 26, comprising a plurality of further instructions that, in response to being executed on the computing device, cause the computing device to release a hardware resource of the connected hardware subsystem related to the temporary failure event in response to a communication from the host that indicates that the host has undertaken a failure mitigation action for the notified temporary failure event, and initiate a self-repair action for the released hardware resource.

Example 28 includes the at least one non-transitory machine readable medium of Example 27, comprising a plurality of further instructions that, in response to being executed on the computing device, cause the computing device to notify the host that the released hardware resource may be reclaimed if the self-repair action is successful.

Example 29 includes the at least one non-transitory machine readable medium of any of Examples 27 to 28, comprising a plurality of further instructions that, in response to being executed on the computing device, cause the computing device to notify the host that the temporary failure event is a permanent failure event if the self-repair action is unsuccessful.

Example 30 includes the at least one non-transitory machine readable medium of Example 26, wherein the connected hardware subsystem corresponds to a memory subsystem, comprising a plurality of further instructions that, in response to being executed on the computing device, cause the computing device to release a portion of memory of the memory subsystem related to the temporary failure event in response to a communication from the host that indicates that the host has temporarily mapped out the portion of memory, and initiate a post-package repair for the released portion of memory.

Example 31 includes the at least one non-transitory machine readable medium of Example 30, comprising a plurality of further instructions that, in response to being executed on the computing device, cause the computing device to notify the host that the released portion of memory may be reused if the post-package repair is successful.

Example 32 includes the at least one non-transitory machine readable medium of any of Examples 29 to 30, comprising a plurality of further instructions that, in response to being executed on the computing device, cause the computing device to notify the host that the portion of memory of the memory subsystem is to remain mapped out if the post-package repair is unsuccessful.

Example 33 includes a subsystem management apparatus, comprising means for providing management of a connected hardware subsystem with respect to one or more of reliability, availability and serviceability, and means for coordinating the management of the connected hardware subsystem with respect to one or more of reliability, availability and serviceability between the connected hardware subsystem and a host.

Example 34 includes the apparatus of Example 33, further comprising means for proactively notifying the host of a temporary failure event for the connected hardware subsystem.

Example 35 includes the apparatus of Example 34, further comprising means for releasing a hardware resource of the connected hardware subsystem related to the temporary failure event in response to a communication from the host that indicates that the host has undertaken a failure mitigation action for the notified temporary failure event, and means for initiating a self-repair action for the released hardware resource.

Example 36 includes the apparatus of Example 35, further comprising means for notifying the host that the released hardware resource may be reclaimed if the self-repair action is successful.

Example 37 includes the apparatus of any of Examples 35 to 36, further comprising means for notifying the host that the temporary failure event is a permanent failure event if the self-repair action is unsuccessful.

Example 38 includes the apparatus of Example 34, wherein the connected hardware subsystem corresponds to a memory subsystem, further comprising means for releasing a portion of memory of the memory subsystem related to the temporary failure event in response to a communication from the host that indicates that the host has temporarily mapped out the portion of memory, and means for initiating a post-package repair for the released portion of memory.

Example 39 includes the apparatus of Example 38, further comprising means for notifying the host that the released portion of memory may be reused if the post-package repair is successful.

Example 40 includes the apparatus of any of Examples 38 to 39, further comprising means for notifying the host that the portion of memory of the memory subsystem is to remain mapped out if the post-package repair is unsuccessful.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
one or more substrates; and
a controller coupled to the one or more substrates, the controller including circuitry which is configured to execute firmware instructions to coordinate a management of a memory subsystem with an operating system (OS) which is to be executed with a host processor of a platform which is to comprise the controller and the memory subsystem, wherein the circuitry to coordinate the management comprises the circuitry to:
proactively provide to the OS a notification of a failure event at the memory subsystem;
receive a communication from the OS which indicates that, based on the notification, the OS is to temporarily map out a page of the memory subsystem which is related to the failure event;
in response to the communication:
release the page of the memory subsystem; and
initiate a self-repair action for the page; and
report to the OS a status of the self-repair action;
wherein the OS is to determine, based on the status, whether the page is to be reclaimed.

2. The electronic apparatus of claim 1, wherein the notification is to comprise a flag value which is to identify the failure event as being temporary.

3. The electronic apparatus of claim 2, wherein the self-repair action is to comprise a run time post package repair action.

4. The electronic apparatus of claim 3, wherein the circuitry is to:

notify the OS that the released page is available to be reclaimed if the self-repair action is successful.

5. The electronic apparatus of claim 3, wherein the circuitry is to:
notify the OS that the failure event is a permanent failure event if the self-repair action is unsuccessful.

6. An electronic system, comprising:
a controller; and
memory communicatively coupled to the controller, wherein the memory stores firmware instructions that when executed by the controller cause the controller to coordinate a management of a memory subsystem with an operating system (OS) which is to be executed with a host processor of a platform which is to comprise the controller and the memory subsystem, wherein the controller to coordinate the management comprises the controller to:
proactively provide to the OS a notification of a failure event at the memory subsystem;
receive a communication from the OS which indicates that, based on the notification, the OS is to temporarily map out a page of the memory subsystem which is related to the failure event;
in response to the communication:
release the page of the memory subsystem; and
initiate a self-repair action for the page; and
report to the OS a status of the self-repair action;
wherein the OS is to determine, based on the status, whether the page is to be reclaimed.

7. The electronic system of claim 6, wherein the notification is to comprise a flag value which is to identify the failure event as being temporary.

8. The electronic system of claim 7, wherein the self-repair action is to comprise a run time post package repair action.

9. The electronic system of claim 8, wherein the controller is to:
notify the OS that the released page is available to be reclaimed if the self-repair action is successful.

10. The electronic system of claim 8, wherein the controller is to:
notify the OS that the failure event is a permanent failure event if the self-repair action is unsuccessful.

11. A method of managing a subsystem, the method comprising:
providing a management of a memory subsystem with respect to one or more of reliability, availability and serviceability; and
with controller circuitry, executing firmware instructions to coordinate the management of the memory subsystem with an operating system (OS) which is executed with a host processor of a platform which comprises the controller circuitry and the memory subsystem, wherein coordinating the management comprises the controller circuitry:
proactively providing to the OS a notification of a failure event at the memory subsystem;
receiving a communication from the OS which indicates that, based on the notification, the OS is to temporarily map out a page of the memory subsystem which is related to the failure event;
in response to the communication:
releasing the page of the memory subsystem; and
initiating a self-repair action for the page; and
reporting to the OS a status of the self-repair action;
wherein the OS determines, based on the status, whether the page is to be reclaimed.

12. The method of claim 11, wherein the notification comprises a flag value which identifies the failure event as being temporary.

13. The method of claim 12, wherein the self-repair action comprises a run time post package repair action.

14. The method of claim 13, wherein:
the OS is notified that the released page is available to be reclaimed if the self-repair action is successful; and
the OS is notified that the failure event is a permanent failure event if the self-repair action is unsuccessful.

* * * * *